(12) United States Patent
Yanagisawa (10) Patent No.: US 8,412,660 B2
(45) Date of Patent: Apr. 2, 2013

(54) MULTI-PAIRS SHORTEST PATH FINDING METHOD AND SYSTEM WITH SOURCES SELECTION

(75) Inventor: Hiroki Yanagisawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 12/816,414

(22) Filed: Jun. 16, 2010

(65) Prior Publication Data

US 2010/0332436 A1 Dec. 30, 2010

(30) Foreign Application Priority Data

Jun. 29, 2009 (JP) .................. 2009-153307

(51) Int. Cl.
*G06F 17/00* (2006.01)
*G06N 5/02* (2006.01)
(52) U.S. Cl. .......................................... 706/46
(58) Field of Classification Search ........................ None
See application file for complete search history.

(56) References Cited

U.S. PATENT DOCUMENTS 6,356,911 B1 * 3/2002 Shibuya .................. 1/1

FOREIGN PATENT DOCUMENTS

JP 2001125882 A 5/2001

OTHER PUBLICATIONS

Eklund et al. "A Dynamic Multi-source Dijkstra's Algorithm for Vehicle Routing", Proc. IIS, 1996, pp. 5.*
Knopp et al. "Computing Many-to-Many Shortest Paths Using Highway Hierarchies", workshop on AEE, 2007, pp. 36-45.*
Köhler et al. "Fast Point-to-Point Shortest Path Computations with Arc-Flags" DIMACS series in DMTCS, 2009, pp. 27.*
Sebastian Knopp et al., "Computing Many-to-Many Shortest Paths Using Highway Hierarchies," ALENEX, 2007.

* cited by examiner

*Primary Examiner* — Jeffrey A Gaffin
*Assistant Examiner* — Li-Wu Chang
(74) *Attorney, Agent, or Firm* — Vazken Alexanian (57) ABSTRACT

A method and system for solving shortest paths from multiple sources to multiple destinations faster. A method of solving the multiple-pairs shortest path problem is provided using processing by a computer having storage means. The method includes the steps of: (A) reading graph data S on multiple vertices as search starting points from a storage area of the computer; (B) reading graph data T on multiple vertices as search targets from the storage area of the computer; (C) selecting k vertices s1, s2, . . . , sk from the graph data S; (D) deleting the k vertices from the graph data S; (E) finding and storing, in the storage area, shortest path lengths from each of the selected k vertices to the graph data T; and (F) repeating the steps from (C) to (E) until the graph data S becomes empty.

9 Claims, 11 Drawing Sheets

DISTANCE MATRIX

| To From | A | B | C | D |
|---|---|---|---|---|
| A | 0 | 2 | 2 | 5 |
| B | 2 | 0 | 3 | 4 |
| C | 2 | 3 | 0 | 3 |
| D | 5 | 4 | 3 | 0 |

MULTI-PAIRS SHORTEST PATH FINDING METHOD AND SYSTEM WITH SOURCES SELECTION

CROSS-REFERENCE TO RELATED APPLICATION

This application claims priority under 35 U.S.C. §119 from Japanese Patent Application No. 2009153307 filed Jun. 29, 2009, the entire contents of which are incorporated by reference herein.

BACKGROUND OF THE INVENTION

1. Field of the Invention

The present invention relates to a multiple-pairs shortest path problem. More particularly, the present invention relates to a method and system for solving the multiple-pairs shortest path problem faster.

2. Description of the Related Art

Conventionally, as a solution to the problem of shortest paths from multiple sources to multiple destinations (multiple-pairs shortest path problem), a technique has been known, in which the shortest path problem from a single source to multiple destinations is applied to multiple sources. For example, Japanese Patent Application Publication No. 2001-125882 describes that each node corresponding to an intersection on a map and a link cost (distance) associated therewith are separated to be independent of each other to find a path using the Dijkstra method while managing them in an adjacency matrix or an adjacency list, respectively. Japanese Patent Application Publication No. 2001-125882 proposes an efficient data structure for solving the shortest path problem from a single source to multiple destinations, but it is not a technique for speedup of the shortest path problem itself.

Sebastian Knopp, Peter Sanders, Dominik Schultes, Frank Schulz, Dorothea Wagner, "Computing Many-to-Many Shortest Paths Using Highway Hierarchies," ALENEX, 2007 solves the shortest path problem (many-to-many) from multiple sources to multiple destinations. Sebastian Knopp et al. describe a method of searching for a road information network. The method includes a step of preprocessing an input graph and a step of applying a modified version of the Dijkstra method to the preprocessed graph. Sebastian Knopp et al. do not offer a method of solving the all-pairs shortest path problem faster. However, Sebastian Knapp et al. has a preprocessing section in which the Dijkstra method is applied to solve the all-pairs shortest path problem (all-to-all).

SUMMARY OF THE INVENTION

The present invention provides a method and system for solving faster the problem of shortest paths from multiple sources to multiple destinations. The present invention further provides a method and system for solving the all-pairs shortest path problem faster.

According to one aspect of the present invention, there is provided a method for solving the multiple-pairs shortest path problem using processing by a computer having storage means. The method includes the steps of: reading graph data S on multiple vertices as search starting points from a storage area of the computer; reading graph data T on multiple vertices as search destinations from the storage area of the computer; selecting k vertices $s1, s2, \ldots, sk$ from the graph data S; deleting the k vertices from the graph data S; finding and storing, in the storage area, shortest path lengths from each of the selected k vertices to the graph data T; and repeating the steps until the graph data S becomes empty.

According to another aspect of the present invention, there is provided a system for solving the multiple-pairs shortest path problem using processing by a computer having storage means. The system includes: means for reading graph data S on multiple vertices as search starting points from a storage area of the computer; means for reading graph data T on multiple vertices as search destinations from the storage area of the computer; means for selecting k vertices $s1, s2, \ldots, sk$ from the graph data S; means for deleting the k vertices from the graph data S; means for finding and storing, in the storage area, shortest path lengths from each of the selected k vertices to the graph data T; and repeating the means until the graph data S becomes empty.

According to a further aspect of the present invention, there is provided a program for solving the multiple-pairs shortest path problem, the program causing a computer having storage means to perform the functions of: reading graph data S on multiple vertices as search starting points from a storage area of the computer; reading graph data T on multiple vertices as search destinations from the storage area of the computer; selecting k vertices $s1, s2, \ldots, sk$ from the graph data S; deleting the k vertices from the graph data S; finding and storing, in the storage area, shortest path lengths from each of the selected k vertices to the graph data T; and repeating the functions until the graph data S becomes empty.

In another aspect of the present invention, there is provided a computer-readable recording medium recording the above program.

According to a preferred embodiment of the present invention, there is provided a noble method and system for solving the problem of shortest paths from multiple sources to multiple destinations faster, and further a method and system for solving the all-pairs shortest path problem faster. Conventionally, data used in GIS has been created by previously spending a considerable amount of time in calculating the multiple-pairs shortest path problem. The present invention has great potential as a technique providing a platform for real-time calculations of multiple-pairs shortest paths.

DETAILED DESCRIPTION OF THE PREFERRED EMBODIMENTS

The multiple-pairs shortest path problem is a problem in which when a graph G (V, E) consisting of a vertex set V and an edge set E, and a distance d(e) (≦0) for each edge e∈E are given, the smallest value of distances from vertices u of all (u, v)∈S×T pairs to vertices v is calculated. Especially, when S and T are equal to V, it is called the all-pairs shortest path problem (all-to-all). In the embodiment, the all-pairs shortest path problem is considered as a special case of the multiple-pairs shortest path problem, and both will be described below as the multiple-pairs shortest path problem (many-to-many) without particularly distinguishing therebetween.

There are many applications of the multiple-pairs shortest path problem, and one of them is an application to GIS (Geographic Information System). A road network can be regarded as a graph, as mentioned above, and the problem of determining distances (or traveling times) between many sites on the road network can be modeled as the multiple-pairs shortest path problem.

Figure 1:
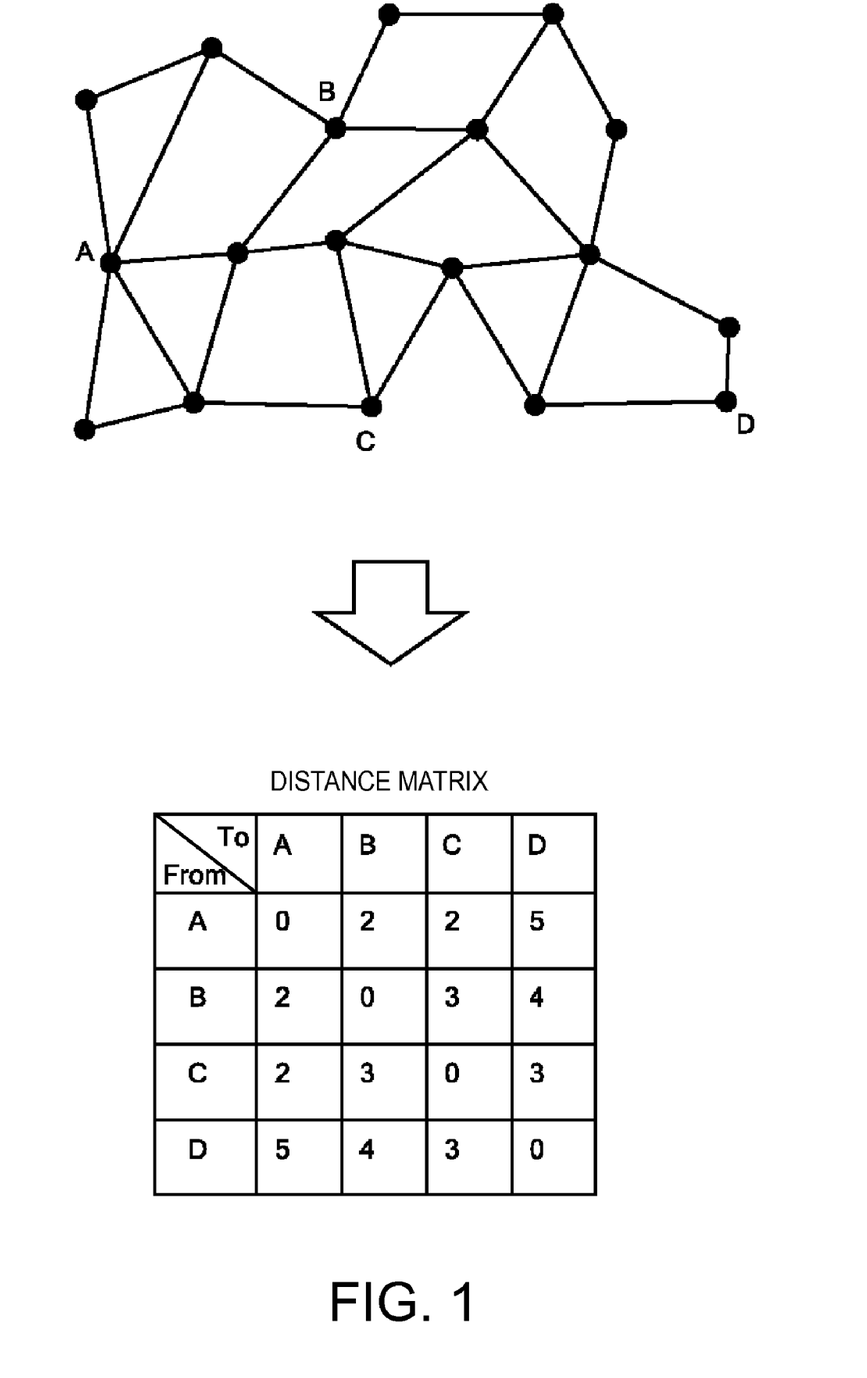
FIG. 1 is an example of the multiple-pairs shortest path problem.

FIG. 1 shows an example of the multiple-pairs shortest path problem. In FIG. 1, inputs are point sets S, T∈V in graph G (V, E). In this case, shortest path lengths of u→v are determined for all (u, v)∈S×T pairs (pairs of points A, B, C, and D in FIG. 1) as outputs. Here, generally S=T. For example, in the example of FIG. 1, when the length of each edge in the graph is 1, the shortest distance from A to D is 5. The following description assumes that the input graph is an undirected graph, but the technique of the present invention can also be applied intact to a directed graph.

Figure 2:
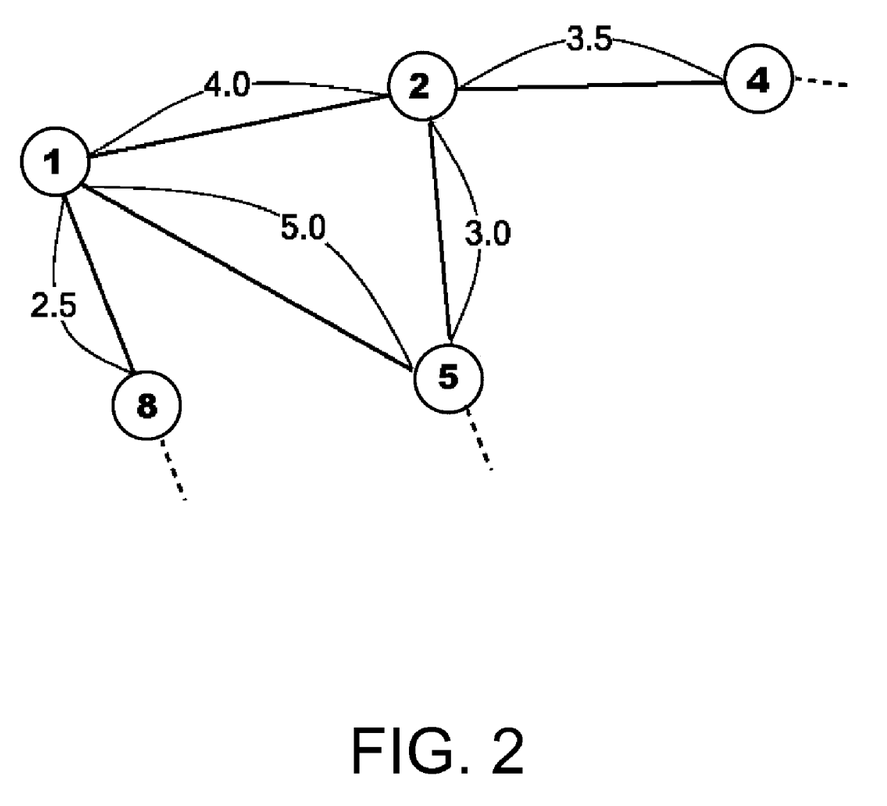
FIG. 2 is an example of the arrangement of vertices in a graph.

FIG. 2 shows the arrangement of vertices in the graph. The vertices in the graph are sequentially numbered from 1. In FIG. 2, the nth vertex is indicated by circling n. In FIG. 2, a vertex 1 has vertices 2, 5, and 8 as adjacent vertices, and the distances to the adjacent vertices are 4.0, 5.0, and 2.5, respectively. A vertex 2 has vertices 1, 4, and 5 as adjacent vertices, and the distances to the adjacent vertices are 4.0, 3.5, and 3.0, respectively.

Figure 3:
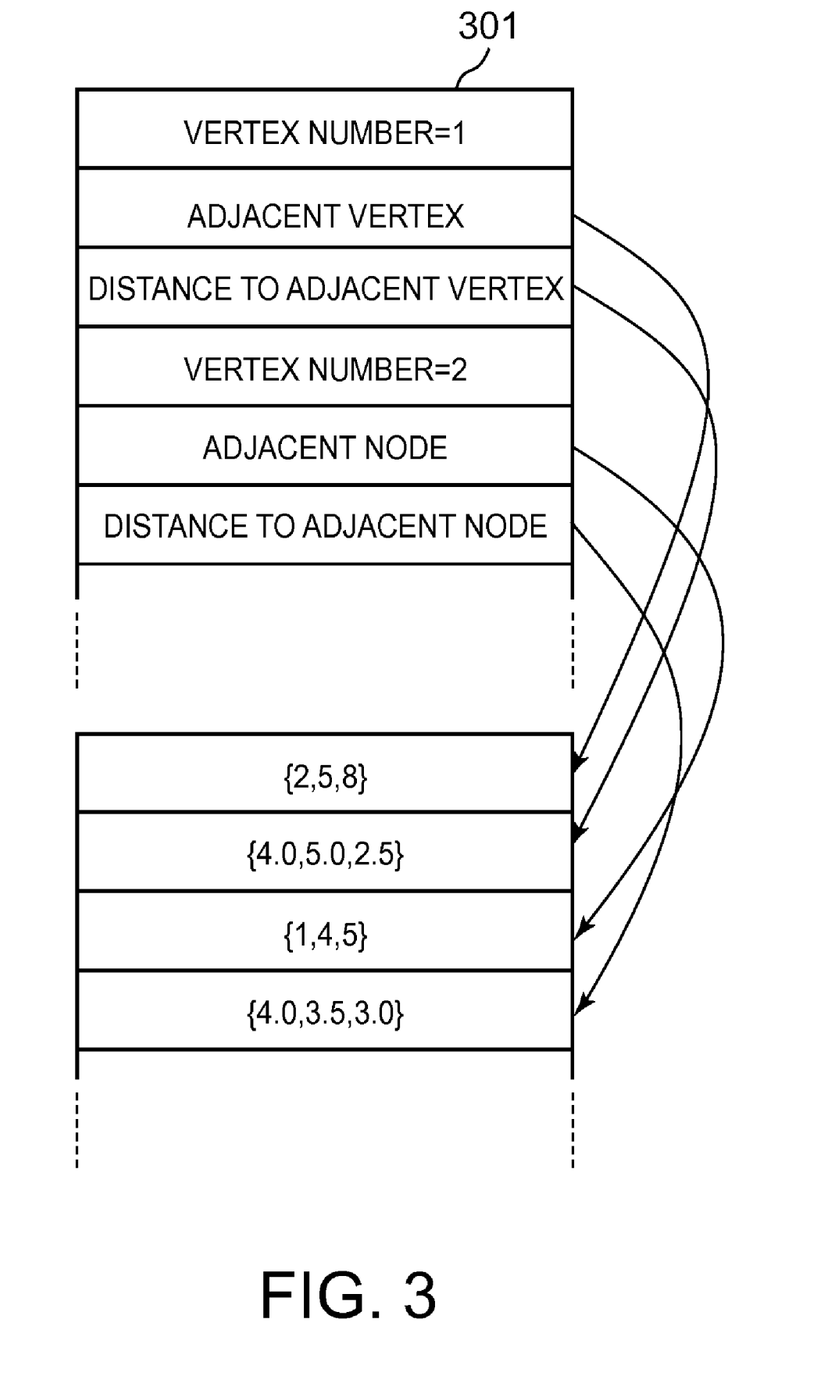
FIG. 3 is a diagram showing the data structure of the graph based on the example of the arrangement of the vertices.

FIG. 3 shows a data structure based on the example of the arrangement of the vertices in the graph shown in FIG. 2. This data is graph data of the present invention as inputs stored in a memory. Each vertex contains a link to a list of adjacent vertex numbers, and a link to a list of distances to the adjacent vertices. Note that such a data structure is just an illustrative example, and various modifications can be made.

Figure 4A:
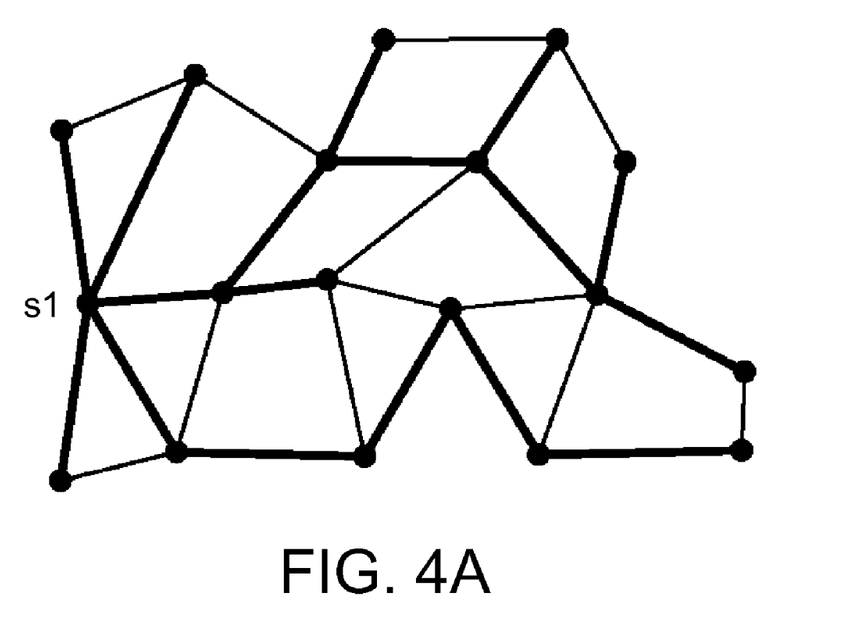
FIG. 4 is a diagram for explaining an example in which two vertices close in distance are set as starting points.
Figure 4B:
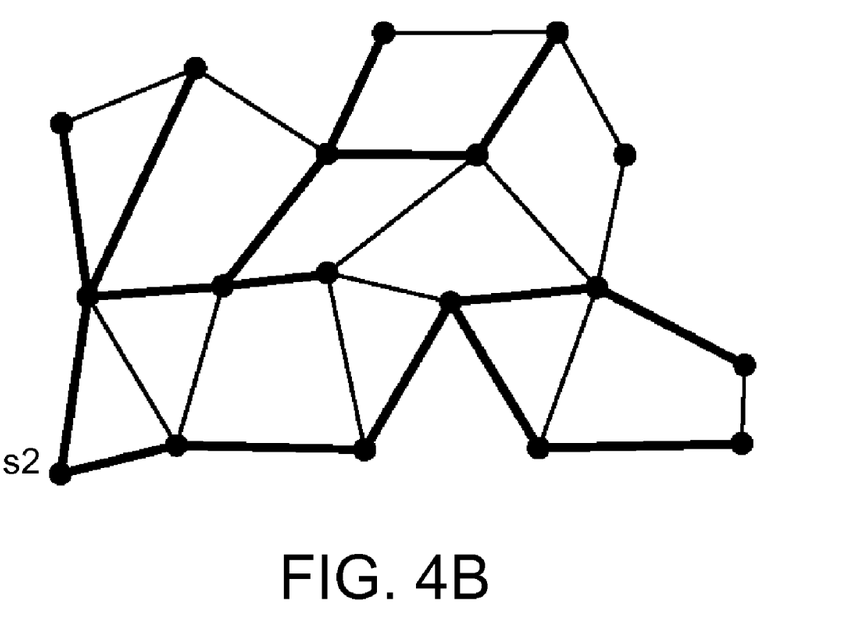

Referring next to FIG. 4, a case where vertices s1 and s2 close in distance in S are set as sources or starting points will be described. In this case, the Dijkstra method is applied |S| times to solve the multiple-pairs shortest path problem, and it is estimated that similar shortest path trees are generated for both. This is because the distance between s1 and s2 is small, and hence the possibility that the shortest path from s1 to a certain vertex v matches the path from s1 to v via s2 is high (though not always match, of course). For this reason, if a shortest path tree (a) with s1 as the starting point and a shortest path tree (b) with s2 as the starting point can be created at once (at the same time), it will lead to speedup.

An algorithm for repeating the Dijkstra method |S| times to solve the multiple-pairs shortest path problem is represented by the following pseudo-code:

```
for s∈S {
    apply Dijkstra method using s as source to solve the single-
    source shortest path problem
}
```

Then, an algorithm proposed in the present invention can be described by the following pseudo-code. Here, the description will be made of the general case of k vertices without being limited to the two vertices. Note that the feature of the present invention is to select k vertices to solve the multiple-source shortest path problem at once.

```
While S is not empty {
    select vertices s1, ..., sk close in distance to each other
    in S
    Let S:= S{s1,...,sk}
    the multiple-source shortest path problem with s1, ..., sk
    as sources is solved at once.
}
```

Figure 5:
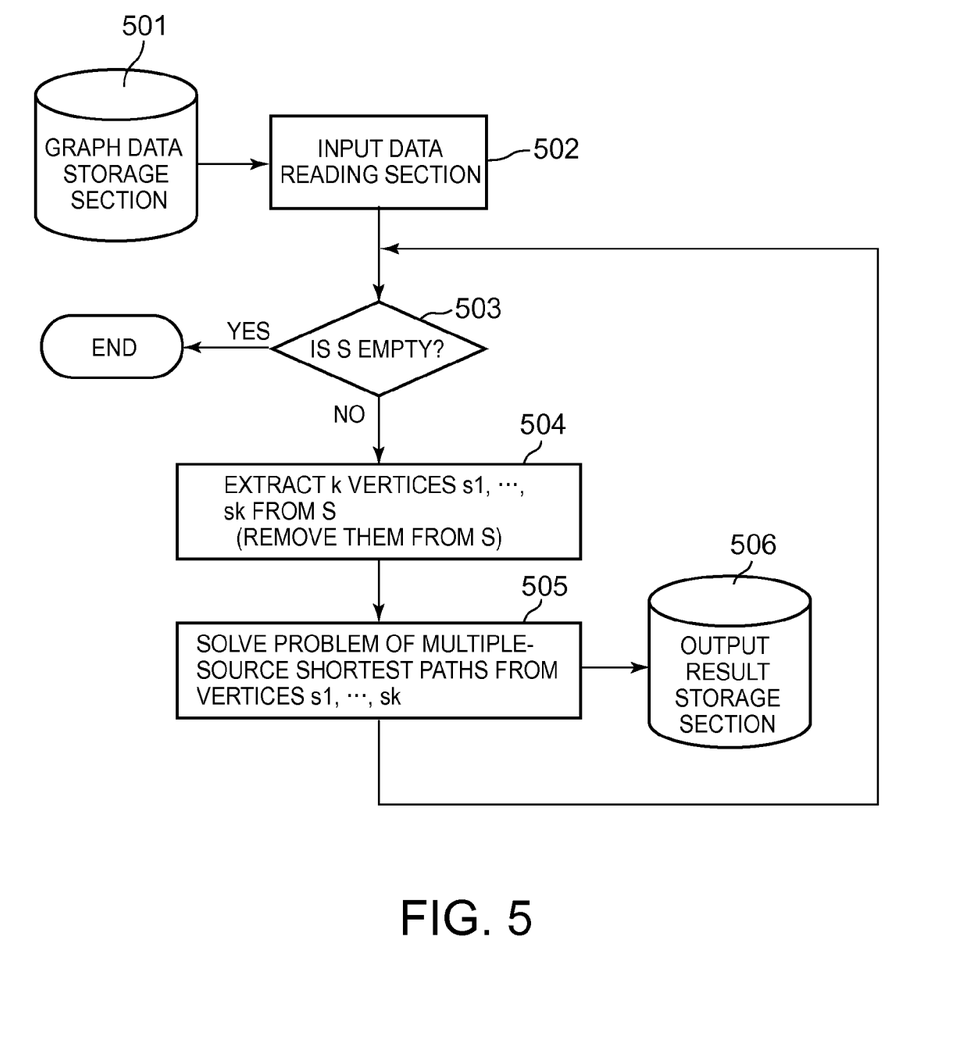
FIG. 5 is a diagram showing the outline of a processing flow of present invention.

FIG. 5 shows the outline of a processing flow of the present invention. In step 502, graph data 501 is read from a graph data storage section 501. In step 503, it is determined whether S is empty. If so, processing is ended, while if not, processing proceeds to step 504. In step 504, k vertices s1, . . . , sk are extracted from S, that is, k vertices are removed from S. Then, in step 505, the multiple-source shortest path problem from vertices s1, . . . , sk is solved, and the results are recorded in an output storage section 506.

Before describing how to solve the multiple-source shortest path problem from vertices s1 . . . , sk at once, a pseudo-code for solving the single-source shortest path problem using the normal Dijkstra method will be shown for the sake of clarity, and then a pseudo-code of the present invention will be described.

<Assumption>

Vertex s: Starting point (Vertex)

Q: Queue (called a priority queue using priority queuing) storing points (vertices) to be searched for Distance[v]: Array storing shortest path lengths found from the starting point s to v Key[v]: Array storing priorities corresponding to vertices v (that is, array of values as keys to determining which vertex v is to be deleted upon deleting a vertex from the priority queue. In the following description of the Dijkstra method, the key [v] takes the same value as the distance [v], but in the technique of the present invention, it may take any value.)

d(e): Length of edge e directed from a vertex to another vertex e.toNode: Destination vertex of edge e <Pseudo-Code for Solving the Single-Source Shortest Path Problem Using Dijkstra Method>

```
Dijkstra (graph G(V,E) , vertex s)
for each v∈V {distance[v]:=∞; key[v]:=∞;}
    distance[s]:=0
    all vertices in V are put into Q
    While Q is not empty {
        delete v with smallest key[v] value from Q
        For each e such that e is outgoing from v {
            temp:=distance[v]+d(e);
            if temp<distance[e.toNode] then {
                distance[e.toNode]:=temp
                key[e.toNode]:=temp
                put e.toNode into Q
            }
        }
    }
Output array distance[ ]
```

Figure 11:
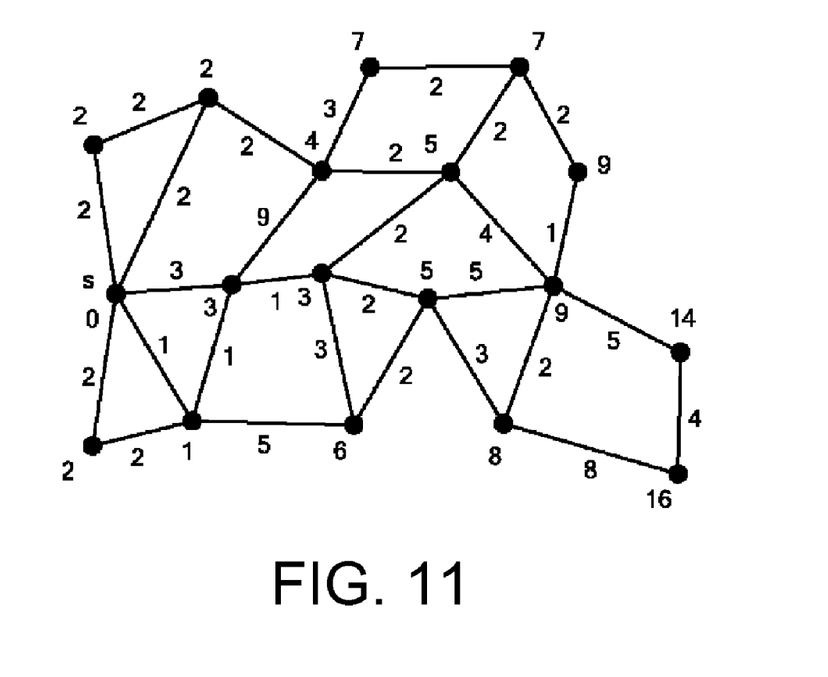
FIG. 11 is an example of finding shortest paths using the Dijkstra method.

FIG. 11 shows an example of finding shortest paths from the starting point s to each vertex using the above Dijkstra method. Each point is connected in the form of a path tree having a specific length as mentioned above, and the shortest distance from the starting point s is written next to each point.

The present invention is to extend the distance array in the above pseudo-code to store shortest path lengths found in distance [i][v] from a starting point si to v.

<Pseudo-Code for Solving the Multiple-Source Shortest Path Problem According to the Present Invention>

```
Dijkstra (graph G(V,E), vertex{s1,...,sk})//Selection
  for i in 1...k {for each v∈V {distance[i][v]: ∞; key[v]:=∞;}}
  for i in 1...k {distance[i][si]:=0; key[si]:=0;}
  all vertices in V are put into Q
  While Q is not empty {
    delete v with smallest key[v] value from Q
    key[v]:=∞
    For each e such that e is outgoing from v {
      newKey:=∞
      For i in 1...k {
        temp:=distance[i][v]+d(e)
        if temp<distance[i][e.toNode]then {
          distance[i][e.toNode]:=temp
          if temp<newKeythen newKey:=temp
        }
      }
      if newKey<key[e.toNode] then
        {key[e.toNode]:=newKey; add e.toNode to Q}//<---update key
    }
  }
  for i in 1...k {output array distance[i]}
```

The array key[v] is an important array in the above pseudo-code. This array key[v] has values as keys to determining which vertex v is to be deleted upon deleting a vertex from the priority queue (Q). In other words, the values put in the key[v] correspond to "priorities" of the priority queue Q. In the Dijkstra method, the values put in the key[v] are always the same as those in the distance[v]. Note that the values in the distance[v] are not necessarily put into the key[v] in the present invention. The execution time varies depending on what value is put into the key[v]. However, the above algorithm always output the shortest path lengths regardless of what value is put.

Figure 12:
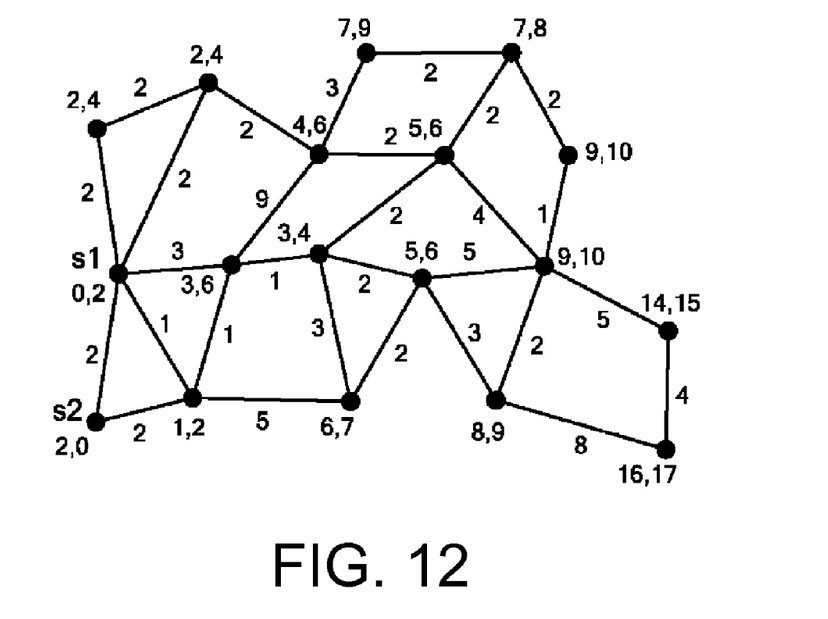
FIG. 12 is an example of finding shortest paths using a search method of the present invention.

FIG. 12 shows an example of finding shortest paths from two vertices s1 and s2 to each vertex using the above search method of the present invention. A set of two shortest distances from each of s1 and s2 is written next to each point. FIG. 12 illustrates the results of calculating two shortest distances for each vertex on condition of k=2.

Figure 6:
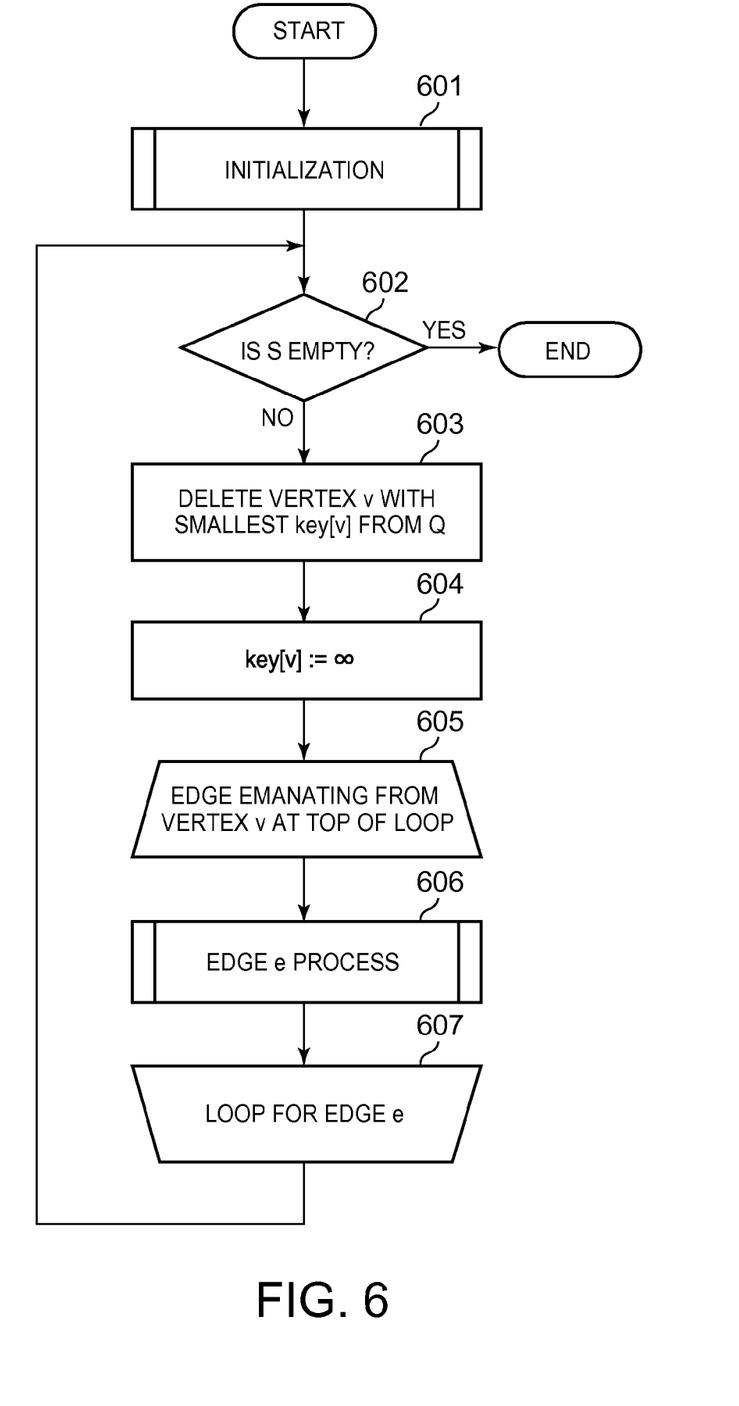
FIG. 6 is an overall flowchart of the present invention.
Figure 7:
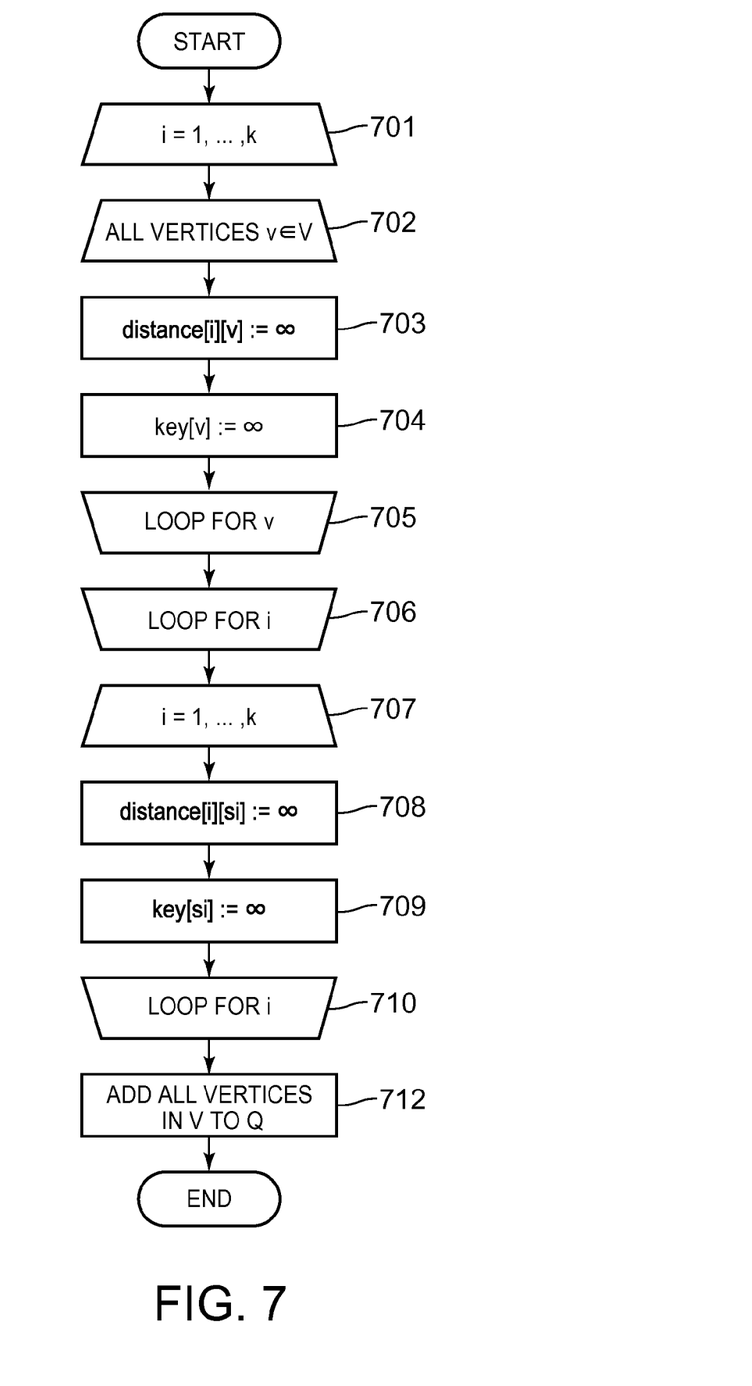
FIG. 7 is a detailed flowchart of initialization.
Figure 8:
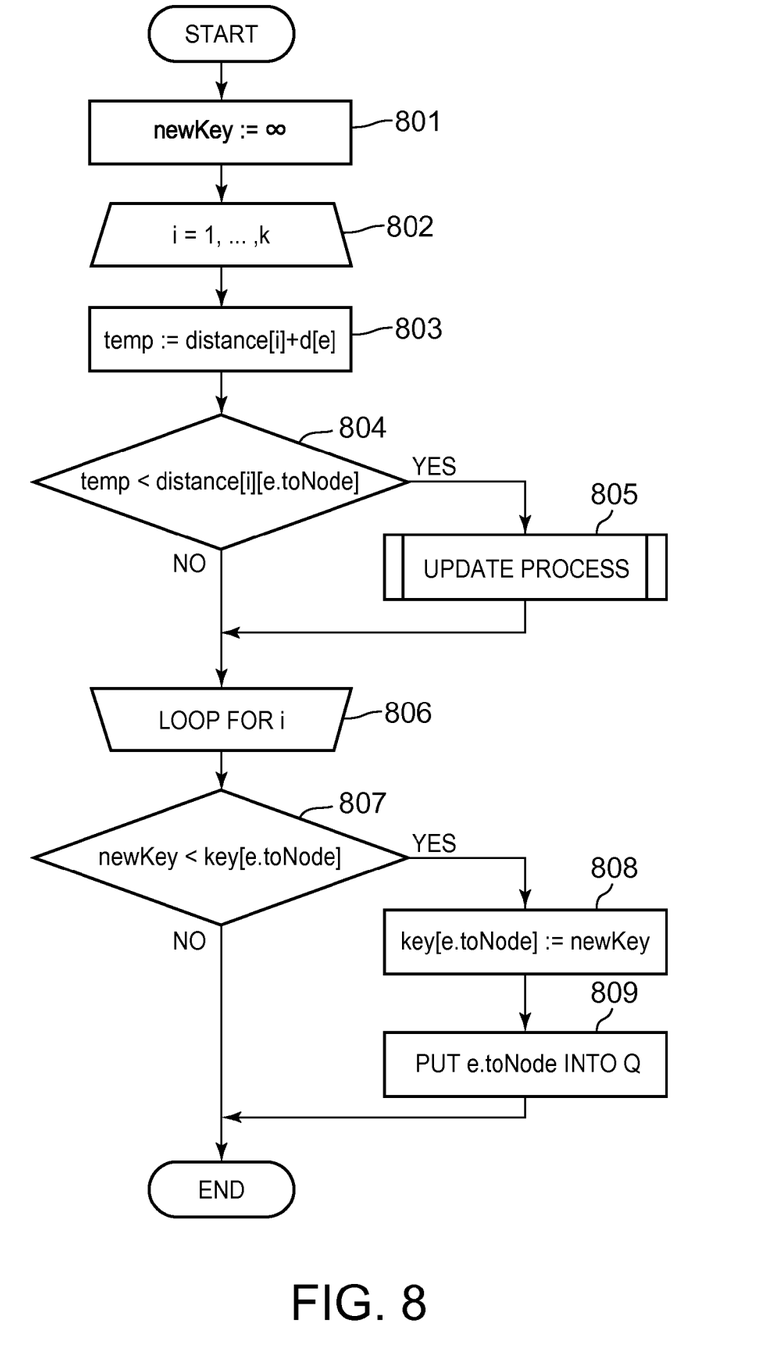
FIG. 8 is a detailed flowchart of a process for each edge.
Figure 9:
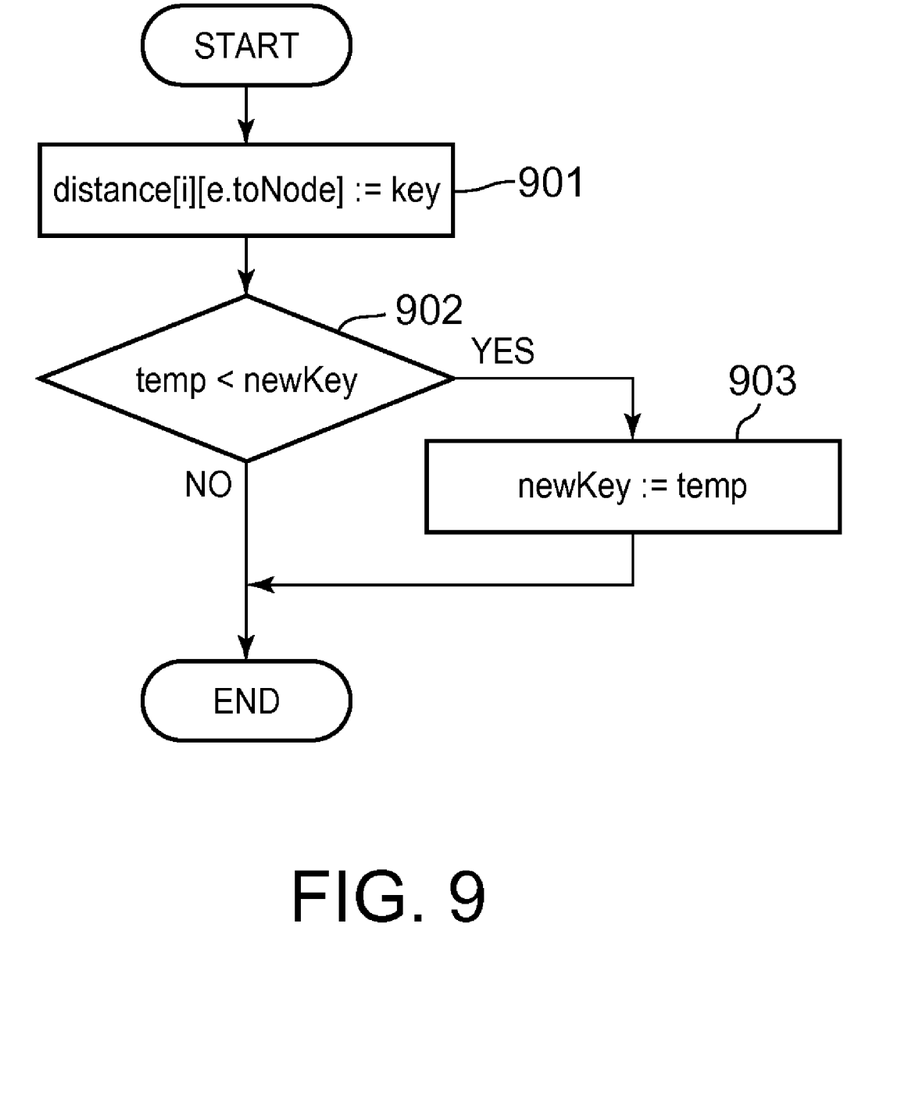
FIG. 9 is a detailed flowchart of an update process.

FIGS. 6 to 9 show a flow of the above pseudo-code of the present invention. FIG. 6 shows the overall flow, FIG. 7 shows a detailed flow of initialization 601, FIG. 8 shows a detailed flow of edge e process 606, and FIG. 9 show a detailed flow of update process 805. First, in FIG. 6, initialization is done at step 601. The details of the initialization will be described in detail later with reference to FIG. 7. In step 602, it is determined whether S is empty. If empty, processing is ended, while if not, a vertex v with the smallest key[v] value is deleted from Q in step 603. In other words, the base point for searching is set to v. Then, the maximum value is substituted into key[v]. Then, the processing is looped to repeat steps 605 to 607 for each edge emanating from v. In this loop, processing is performed on edge e (step 606). This processing step 606 will be described in detail later with reference to FIG. 8.

FIG. 7 shows the detailed flow of the initialization 601. First, in step 701, k vertices are selected as starting points. Next, in steps 702 to 704, the maximum values for each of all vertices v∈V are substituted into the arrays distance[i][v] and key[v]. Here, although ∞ is substituted as the maximum values, it is assumed that the values actually stored in the memory are preset to values greater enough than values that can be taken as path lengths in the graph. Step 702 to step 705 are to configure a loop for v. Steps 707 to 710 are to substitute the maximum values into the array distance[i][si] and key[si] for variable i=1,..., k. Finally, in step 712, all the vertices in V are added to Q to end the initialization.

The initialization may be done in any manner as long as long as the array distance[i][v] is the upper limit of shortest path length from si to v in the above initialization. For example, in the array distance[i][si], the correct shortest path lengths may be calculated separately for i=1,..., k so that the calculated values will be set as the above maximum values.

FIG. 8 shows the detailed flow of the edge e process 606. In step 801, the maximum value is substituted for newKey. Next, a loop of step 802 to step 806 is configured for i=1,..., k. In step 803, the sum of the path length distance[i] and the length d(e) of edge e is substituted for temporary variable temp. Then, it is determined in step 804 whether the value of the temporary variable temp is smaller than array distance[i][e.toNode]. If smaller, processing shifts to the update process in step 805. If not, processing is performed on next i in step 806. After completion of the loop from step 802 to step 806, processing proceeds to step 807. In step 807, it is determined whether newKey is smaller than key[e.toNode]. If not smaller, processing is ended. If smaller, processing proceeds to step 808. In step 808, newKey is substituted into key [e.toNode], and in step 809, e.toNode is substituted into Q.

In the processing (update key) of steps 808 and 809, the pseudo-code of the present invention works correctly even if any value is put into key[e.toNode]. In other words, the value of newKey is not necessarily put. However, the execution time varies depending on what value is put in steps 808 and 809. The above pseudo-code is an illustrative example of implementation, and various modifications can be made.

FIG. 9 shows the detailed flow of the update process 805. In step 901, the key is substituted into array distance[i][e.toNode]. Next, it is determined in step 902 whether the temporary variable temp is smaller than newKey. If smaller, processing proceeds to step 903 to substitute the temporary variable temp for newKey. If the temporary variable temp is not smaller than newKey, processing ends.

As an example of the selection of s1,..., sk in the pseudo-code, there is a method in which, after selecting s1∈S properly, k vertices close in distance from s1 are extracted in order. For example, as a method of selecting near vertices, A* algorithm or the Dijkstra method may also be used. The value of k also depends on the number of graph data, and experiment results show that 8 to 64 are good.

The following shows a pseudo-code using the Dijkstra method upon selecting s1,..., sk as an illustrative example. Here, it is assumed that any unselected vertex is in S in the previous repetitive processing (iteration).

```
SelectVertices(graph G(V,E), S)
  select one vertex s1 from S, and set U={s1}
  for each v∈V {distance[v]:=∞; key[v]:=∞;}
  distance[s1]:=0
  put all vertices in V into Q
  While Q is not empty {
    delete v with smallest key[v] value from Q
    If v∈S then {add v to U
      If magnitude |U| of U is equal to k, then
        {output U and end processing}
    }
    For each e such that e is outgoing from v {
      temp:=distance[v]+d(e);
      if temp<distance[e.toNode] then {
        distance[e.toNode]:=temp
        key[e.toNode]:=temp
```

```
            put e.toNode into Q
        }
    }
}
```

<Block Diagram of Computer Hardware>

Figure 10:
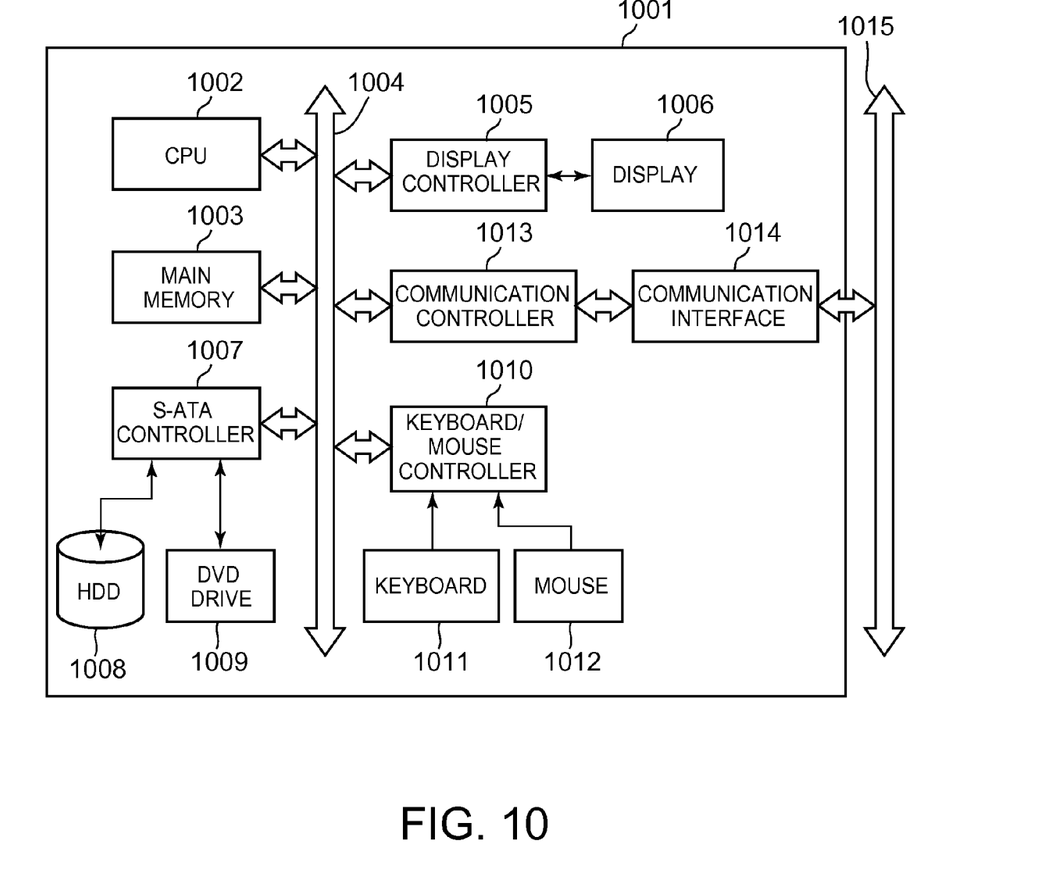
FIG. 10 is a block diagram of computer hardware.

FIG. 10 is a block diagram showing an example of computer hardware included in the system of FIG. 5 according to the embodiment of the present invention. A computer system (1001) according to the embodiment of the present invention includes a CPU (1002) and a main memory (1003), both connected to a bus (1004). Preferably, the CPU (1002) is based on the 32-bit or 64-bit architecture. For example, Intel Xeon® series, Core™ series, Atom™ series, Pentium® series, and Celeron® series, or AMD Phenom™ series, Athlon™ series, Turion™ series, and Sempron™, can be used as the CPU.

A display (1006) such as an LCD monitor is connected to the bus (1004) through a display controller (1005). For the purpose of management of the computer system, the display (1006) is used to display, on an appropriate graphic interface, information on the computer system connected to a network through a communication line and information on software running on the computer system. A hard disk or silicon disk (1008), and a CD-ROM, DVD drive, or Blu-ray drive (1009) are also connected to the bus (1004) through an IDE or SATA controller (1007).

An operating system, programs including the code of the present invention, and data are stored in the hard disk (1008) in such a manner to be loadable to the main memory (1003). Preferably, the hard disk (1008) is used as the graph data storage section 501 of the present invention. Graph data stored in the graph data storage section 501 is read by an input data reading section 502 and stored in the main memory (1003).

The CD-ROM, DVD, or Blu-ray drive (1009) is used to add a program to the hard disk from a CD-ROM, DVD-ROM, or Blu-ray disk as required. Further, a keyboard (1011) and a mouse (1012) are connected to the bus (1004) through a keyboard/mouse controller (1010). The graph data in the present invention may be stored in and read from the above-mentioned external storage device.

A communication interface (1014) follows the Ethernet® protocol, for example. The communication interface (1014) is connected to the bus (1004) through a communication controller (1013), playing a role in physically connecting the computer system and a communication line (1015) to provide a network interface layer for the TCP/IP communication protocol as the communication function of the operating system in the computer system. The communication line may be a wired LAN environment, or a wireless LAN environment based on the wireless LAN standards such as IEEE802.11a/b/g/n. The graph data in the present invention may be loaded from an external database through the communication interface (1014).

<Experimental Result>

Both the method of repeatedly applying the normal Dijkstra method and the algorithm proposed in the present invention were implemented and compared in terms of the execution time (excluding the time required for input and output). In the experiment, state-by-state road network information in the United States (TIGER/Line), which is open to the public, was used as input data. The results of measurement of the times required to solve the all-pairs shortest path problem for input data DC show that the technique of the present invention is three times faster than the normal Dijkstra method. One of reasons for the speedup is that the technique of the present invention reduces the operations for the priority queue, which is the bottleneck of the Dijkstra method.

What is claimed is:

1. A method of solving a multiple-pairs shortest path problem using processing by a computer having storage means, the method comprising the steps of:
   reading graph data S on multiple vertices as search starting points from a storage area of the computer;
   reading graph data T on multiple vertices as search destinations from the storage area of the computer;
   selecting k vertices s1, s2, . . . , sk, k>1, based on close distance measure in order using Dijkstra method from the graph data S;
   deleting the k vertices from the graph data S;
   finding and storing, in the storage area, shortest path lengths from each of the selected k vertices to the graph data T; and
   repeating the steps of selecting k vertices, deleting k vertices, and finding and storing shortest path lengths until the graph data S becomes empty.

2. The method according to claim 1, wherein the step of finding and storing shortest path lengths comprises the steps of:
   setting search target vertices as a priority queue Q and substituting all the vertices of the graph data into the priority queue Q;
   storing predetermined maximum values into an array distance for storing shortest path lengths from the k vertices to all the vertices of the graph data;
   storing predetermined maximum values in an array key representing priority of the priority queue;
   storing zero in corresponding elements of the arrays distance and key for storing the shortest path lengths from the k vertices to each of the search target vertices;
   deleting a vertex v smallest in value in the array key from Q;
   setting a predetermined maximum value in the array key for the vertex v;
   calculating a path length from each of the k vertices to each of vertices adjacent to the vertex v smallest in value, and when the calculated value is smaller than a current array distance value, substituting the value into the array distance to substitute a value representing search priority into the array key; and
   repeating the steps of deleting a vertex v, setting a predetermined maximum value and calculating a path length until the vertices in Q as the search targets become empty.

3. The method according to claim 2, wherein the step of calculating a path length comprises the steps of:
   substituting, for a variable newKey, a predetermined maximum value of each of the vertices adjacent to the vertex v smallest in value;
   calculating a path length from each of the k vertices to the adjacent vertex and substituting the calculated value for a variable temp;
   substituting the value of the variable temp into the array distance when the value is smaller than a value in the array distance for the adjacent vertex, determining whether the value of the variable temp is smaller than the value of the variable newKey, and if smaller, substituting the value of the variable temp for the variable newKey; and
   substituting the value of the variable newKey into the array key when the variable newKey is smaller than a value in the array key for the adjacent vertex.

4. A system for solving a multiple-pairs shortest path problem using processing by a computer having storage means, the system comprising:
- means for reading graph data S on multiple vertices as search starting points from a storage area of the computer;
- means for reading graph data T on multiple vertices as search destinations from the storage area of the computer;
- means for selecting k vertices s1, s2, ..., sk, k>1, based on close distance measure in order using Dijkstra method from the graph data S;
- means for deleting the k vertices from the graph data S;
- means for finding and storing, in the storage area, shortest path lengths from each of the selected k vertices to the graph data T; and
- repeating the means for selecting k vertices, deleting the k vertices, and finding and storing shortest path lengths until the graph data S becomes empty.

5. The system according to claim 4, wherein the means for finding and storing shortest path lengths comprises:
- means for setting search target vertices as a priority queue Q and substituting all the vertices of the graph data into the priority queue Q;
- means for storing predetermined maximum values into an array distance for storing shortest path lengths from the k vertices to all the vertices of the graph data;
- means for storing predetermined maximum values in an array key representing priority of the priority queue;
- means for storing zero in corresponding elements of the arrays distance and key for storing the shortest path lengths from the k vertices to each of the search target vertices;
- means for deleting a vertex v smallest in value in the array key from Q;
- means for setting a predetermined maximum value in the array key for the vertex v;
- means for calculating a path length from each of the k vertices to each of vertices adjacent to the vertex v smallest in value, and when the calculated value is smaller than a current array distance value, substituting the value into the array distance to substitute a value representing search priority into the array key; and
- means for repeating the means for deleting a vertex v, setting a predetermined maximum and calculating a path length until the vertices in Q as the search targets become empty.

6. The system according to claim 5, wherein the means for calculating a path length comprises:
- means for substituting, for a variable newKey, a predetermined maximum value of each of the vertices adjacent to the vertex v smallest in value;
- means for calculating a path length from each of the k vertices to the adjacent vertex and substituting the calculated value for a variable temp;
- means for substituting the value of the variable temp into the array distance when the value is smaller than a value in the array distance for the adjacent vertex, determining whether the value of the variable temp is smaller than the value of the variable newKey, and if smaller, substituting the value of the variable temp for the variable newKey; and
- means for substituting the value of the variable newKey into the array key when the variable newKey is smaller than a value in the array key for the adjacent vertex.

7. A computer program stored in a non-transitory computer-readable recording medium for solving a multiple-pairs shortest path problem, the program causing a computer having storage means to perform the functions of:
- reading graph data S on multiple vertices as search starting points from a storage area of the computer;
- reading graph data T on multiple vertices as search destinations from the storage area of the computer;
- selecting k vertices s1, s2, ..., sk, k>1, based on close distance measure in order using Dijkstra method from the graph data S;
- deleting the k vertices from the graph data S;
- finding and storing, in the storage area, shortest path lengths from each of the selected k vertices to the graph data T; and
- repeating the functions selecting k vertices, deleting the k vertices, and finding and storing shortest path lengths until the graph data S becomes empty.

8. The computer program according to claim 7, wherein the function of finding and storing shortest path lengths comprises the functions of:
- setting search target vertices as a priority queue Q and substituting all the vertices of the graph data into the priority queue Q;
- storing predetermined maximum values into an array distance for storing the shortest path lengths from the k vertices to all the vertices of the graph data;
- storing predetermined maximum values in an array key representing priority of the priority queue;
- storing zero in corresponding elements of the arrays distance and key for storing the shortest path lengths from the k vertices to each of the search target vertices;
- deleting a vertex v smallest in value in the array key from Q;
- setting a predetermined maximum value in the array key for the vertex v;
- calculating a path length from each of the k vertices to each of vertices adjacent to the vertex v smallest in value, and when the calculated value is smaller than a current array distance value, substituting the value into the array distance to substitute a value representing search priority into the array key; and
- repeating the functions of deleting a vertex v, setting a predetermined maximum value and calculating a path length until the vertices in Q as the search targets become empty.

9. The computer program according to claim 8, wherein the function of calculating a path length comprises the functions of:
- substituting, for a variable newKey, a predetermined maximum value of each of the vertices adjacent to the vertex v smallest in value;
- calculating a path length from each of the k vertices to the adjacent vertex and substituting the calculated value for a variable temp;
- substituting the value of the variable temp into the array distance when the value is smaller than a value in the array distance for the adjacent vertex, determining whether the value of the variable temp is smaller than the value of the variable newKey, and if smaller, substituting the value of the variable temp for the variable newKey; and
- substituting the value of the variable newKey into the array key when the variable newKey is smaller than a value in the array key for the adjacent vertex.

* * * * *